United States Patent [19]

Foster et al.

[11] 3,875,357

[45] Apr. 1, 1975

[54] SEWAGE DISPOSAL SYSTEM

[75] Inventors: Edward P. Foster, Hartville; Robert J. Kelly, Wadsworth; Warnie L. Sage, Louisville, all of Ohio

[73] Assignee: The Babcock & Wilcox Company, New York, N.Y.

[22] Filed: Nov. 1, 1973

[21] Appl. No.: 411,854

Related U.S. Application Data

[63] Continuation-in-part of Ser. No. 172,384, Aug. 17, 1971, abandoned.

[52] U.S. Cl. .................. 210/59, 210/59, 210/71, 210/152, 210/180, 110/8 P, 110/10
[51] Int. Cl. ............................................. C02c 3/00
[58] Field of Search ......... 210/67, 71, 152, 180, 59; 110/8 P, 10

[56] References Cited
UNITED STATES PATENTS

| | | | |
|---|---|---|---|
| 3,246,761 | 4/1966 | Bryan et al. | 210/180 |
| 3,549,529 | 12/1970 | Wiseman | 210/71 X |
| 3,601,070 | 8/1971 | Lambiris | 110/10 |
| 3,622,511 | 11/1971 | Pizzo et al. | 210/67 X |
| 3,623,977 | 11/1971 | Reid | 210/152 X |
| 3,625,883 | 12/1971 | Valdespino | 210/67 X |
| 3,633,746 | 1/1972 | Dieterich | 210/71 |
| 3,638,590 | 2/1972 | Roberts et al. | 210/67 X |
| 3,762,549 | 10/1973 | Crampton | 210/152 X |

*Primary Examiner*—Thomas G. Wyse
*Attorney, Agent, or Firm*—Joseph M. Maguire; Robert J. Edwards

[57] ABSTRACT

A sewage disposal comprising a fossil-fuel fired steam generating unit having a furnace chamber and burner means for maintaining a high temperature zone in the furnace chamber, nozzle means for injecting a liquid-solids sewage mixture into the combustion zone, the sewage input being regulated to maintain a sewage to fuel input ratio resulting in substantially complete vaporization and incineration of the liquid-solids sewage mixture within the furnace chamber.

14 Claims, 1 Drawing Figure

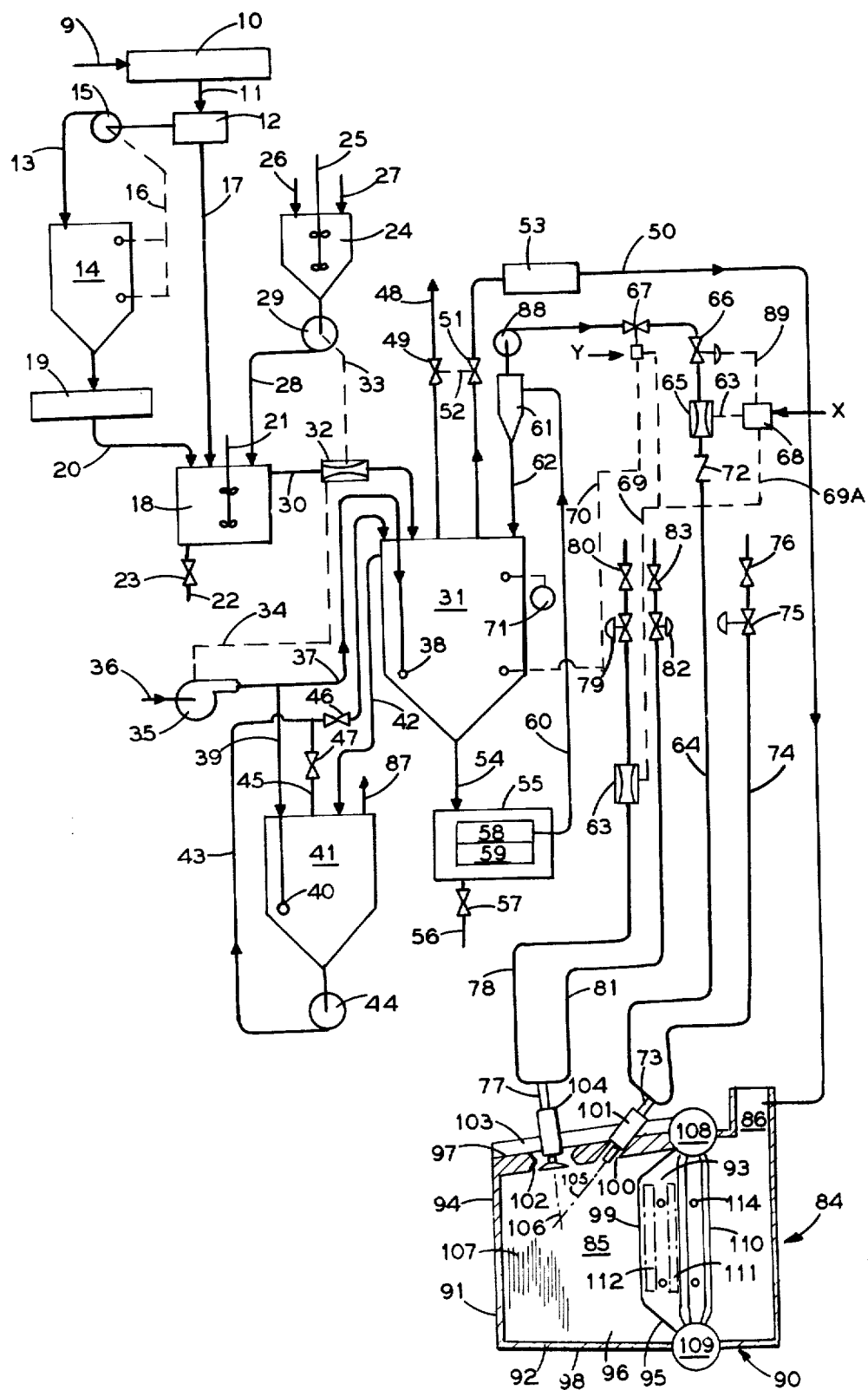

SEWAGE DISPOSAL SYSTEM

This application is a continuation-in-part of U.S. Patent application Ser. No. 172,384, filed Aug. 17, 1971 now abandoned.

BACKGROUND OF THE INVENTION

The present invention relates to sewage disposal systems and more particularly to shipboard sewage disposal which includes vaporizing and incinerating a liquid-solids sewage mixture in the boiler furnaces associated with ship's thermal power plant.

There is a present day growing concern with the immediate and long term problems created by the rapid increase in air and water pollution resulting from the rise in the industrial civilization level throughout the world. With this concern comes an acute awareness that immediate steps must be taken to reverse this upward trend in pollution and great efforts are now being made by the public and private economic sectors to develop measures for preventing potentially polluting particles from being discharged into the atmosphere and/or water. One such source of water pollutant is the sewage effluent aboard the ships which ply the navigable waters of the world. The present invention is directed at those ships which are equipped with main propulsion boilers, and is concerned with eliminating their sewage effluent through vaporization and incineration in the ship's boiler furnace.

SUMMARY OF THE INVENTION

The present invention includes a shipboard disposal system which eliminates the practice of overboard discharge of the shipboard sewage effluent and provides the hygienic alternative of chemically treating and disposing of the treated sewage in the combustion zone of the furnace associated with the ship's main propulsion boiler. The system also provides adequate capacity for storing the liquid-solids sewage mixture when it is not being injected into the boiler furnace due to low firing rate, or when the boiler is shut down.

In accordance with the invention, there is provided a shipboard sewage disposal method and apparatus using the ship's boiler furnace and associated fuel firing equipment to substantially completely vaporize and incinerate the liquid-solids sewage mixture within the furnace.

The invention comprises the delivery of fresh water to the ship's galley, laundry and fresh water systems with the effluent therefrom being conveyed for chemical treatment in a disinfectant contact tank with the exception of a portion thereof which is filtered-out and recycled through the ship's sanitary system before being separately conveyed to the disinfectant tank. There is a retention period in the tank to allow for complete chemical disinfection of the liquid-solids sewage mixture and use is made of rotary blade type agitators to promote the chemical treatment. The chemically treated sewage mixture is thereafter conveyed to a main holding tank where it is aerated and then discharged to a sump including a grinding apparatus for comminuting the solids contained in the sewage mixture to a particle size range which will readily burn when injected into the combustion zone of the ship's boiler furnace. The comminuted sewage leaving the grinding apparatus is screened through a centrifugal separator or hydroclone for the removal of any particles exceeding the predetermined size range, with these oversize particles being returned to the main holding tank for eventual regrinding. The acceptably sized sewage is pumped to an injection nozzle which employs steam to atomize the sewage before it is injected into the combustion zone of the furnace associated with the ship's boiler. The combustion zone is maintained at a high temperature by the ship's fuel oil burners with the firing rate being regulated by the demands of the ship's propulsion and auxiliary equipment. The injection of sewage into the furnace combustion zone will only be allowed when the fuel input to the burner associated with the sewage nozzle exceeds a predetermined level. Whenever the fuel input is below this predetermined level, injection is discontinued and the sewage mixture is recirculated through the main holding tank with any excess being conveyed to one of more auxiliary holding tanks and recirculated therein. Upon resumption of injection, the excess sewage is recycled into the main holding tank for eventual delivery to the furnace combustion zone. The sewage input to the injection nozzle is regulated to maintain a sewage to fuel input ratio resulting in substantially complete vaporization and incineration of the liquid-solids sewage mixture within the furnace chamber.

BRIEF DESCRIPTION OF THE DRAWING

The drawing is a diagramatic illustration of a sewage disposal embodying the invention.

DESCRIPTION OF THE PREFERRED EMBODIMENT

Referring to the drawing, there is diagrammatically shown a shipboard sewage or waste disposal including a supply of fresh water at 9 being delivered to the galley, laundry and wash water system at 10 and the drainage therefrom being conveyed through conduit 11 to filter 12, which may be a conventional screen type filter, wherein a measured portion of the sewage water is filtered-out and drawn into conduit 13 by a pump 15 and is conveyed to a sanitary water supply tank 14 for use in the ship's sanitary system at 19, a suitable level control device (not shown) transmits a control signal through line 16 which regulates the pump 15 to maintain an adequate supply of sanitary wash water in the tank 14.

The unfiltered remaining portion of the sewage leaves the filter 12 through a conduit 17 to be discharged into a disinfectant contact tank 18. The drainage for the ship's sanitary system 19 is conveyed by conduit 20 for discharge into the disinfectant contact tank 18. A rotary blade type agitator 21 is used to keep the sewage entrained solids in suspension during a temporary retention of the effluent in tank 18. The sewage leaves the tank 18 through an overflow connection near the top of the tank and is conveyed for discharge to the main holding tank 31 by a conduit 30 which includes a metering device 32 for monitoring the quantity of sewage being discharged in the main tank 31. The disinfectant contact tank 18 is provided with a drain connection 22 and a valve 23 to facilitate emptying the tank for periodic cleaning, and maintenance and/or repair.

The chemicals used for disinfecting the sewage may be Chloride of Lime ($CaOCl_2$) or Sodium Hypochlorite (NaClO) or any other suitable composition of chemicals in solid form, and are introduced at the top of a disinfectant chemical mix tank 24 through a conduit 27. Water is introduced at the top of the mix tank 24 through a conduit 26 and the combination of chemicals and water it thoroughly mixed by a rotary blade type agitator 25 and the mixture is, thereafter, fed through a conduit 28 to the disinfectant contact tank 18. If a chlorine based disinfectant is used, the disinfecting mixture will be added to maintain approximately 200 p.p.m. as $Cl_2$ in the disinfectant tank with the latter being sized to allow an average sewage retention time of about one half hour. The conduit 28 includes a pump 29 which regulates the quantity flow of disinfecting mixture to the tank 18. The pump is actuated by the metering device 32 which transmits a control signal through line 33 indicating the quantity of sewage being discharged to the main holding tank 31.

The main holding tank 31 is provided with an overflow connection located near the top of the tank and communicating with a conduit 42 to discharge the excess sewage into an auxiliary holding tank 41. The auxiliary holding tank 41 discharges through a conduit 43 which includes a return conduit 45 to allow continuous recirculation of the sewage within the tank 41. The conduit 43 includes a trash pump 44 as well as a shut-off valve 46, the latter cooperating with a shut-off valve 47 in the return conduit 45 to either recirculate sewage through auxiliary tank 41 or discharge sewage to the main holding tank 31. When sewage is being injected into the ship's boiler furnace, the valve 47 is closed and the valve 46 is open to permit excess sewage to be pumped back into the main tank 31. During shutdown of the injection process, excess sewage is stored in the auxiliary holding tank 41 with the valve 46 being closed and the valve 47 being open to permit continuous recirculation of the sewage within the auxiliary tank 41. The auxiliary holding tank 41 is equipped with spargers 40 to provide continuous circulation or air through the sewage mixture thereby preventing it from becoming septic, and includes a vent line 87 for venting the circulated air after it has passed through the stored sewage. While the present embodiment is shown with one auxiliary holding tank, it is to be appreciated that the invention may have more than one such tank depending on the capacity of the sewage disposal system.

The aeration for the main and excess sewage holding tanks 31 and 41, respectively, is provided by an air blower 35 having an air intake at 36 and discharging into a conduit 37 for delivering air to the spargers 38 located in the main tank 31, and a conduit 39 connected to the conduit 37 for delivering air to the spargers 40 located in the excess sewage holding tank 41. The output of the blower 35 is regulated according to the sewage discharge to the main tank 31 as measured by the metering device 32 with a representative signal being transmitted through the control line 34 to the blower 35. The spargers are located at one side of the respective tanks and near the bottom thereof to provide for natural air circulation. The air to the spargers is supplied at a pressure of 5 to 6 p.s.i. and at a quantity of 3 to 7 c.f.m. depending on the flow rate of sewage.

The main holding tank 31 is formed with a bottom sloped about 45° so as to prevent deposition and includes a vent 48 discharging to atmosphere and a vent 50 equipped with a flare arrester 53 and discharging in the outlet duct 86 of the boiler or steam generating unit 84. The vents 48 and 50 are equipped with shut-off valves 49 and 51, respectively, these valves being interconnected through a control line 52 and actuated by a control device (not shown) whereby the main tank 31 may be selectively vented either to atmosphere or to the steam generator 84. The atmospheric vent is used whenever the steam generator is shut down or the fuel firing rate is less than a predetermined level, with the vents 48 and 50 being controlled so that one of them is always open to allow the venting of circulated air thereby insuring adequate aeration of the sewage. The main holding tank 31 discharges through a conduit 54 to a sump 55, the latter being provided with a drain 56 including a shut-off valve 57. A grinder 59 and a pump 58 are submersed in the sump with the former being used to reduce the sewage solids to a particle size range of approximately 0 to ¼ in., and the latter being used to pump the comminuted sewage through the conduit 60 to a hydroclone 61 which may be a conventional centrifugal type separator, wherein the oversize particles are removed and returned to the main holding tank 31 through the recirculating or return conduit 62. While the present embodiment shows a centrifugal type separator, it is to be appreciated that the invention may use continuously self-cleaning screens, instead. Whenever sewage is not being injected into the ship's boiler furnace, the shut-off valve 67 in the sewage nozzle supply line 64 is closed and the sewage discharging from the conduit 60 is recirculated back through the hydroclone 61 and the return conduit 62 to the main tank 31. The pump 58 is always in operation to permit continuous recirculation of the sewage within the main holding tank 31. The main holding tank is provided with a high level alarm at 71 and a low level control device (not shown), the latter will transmit a control signal through line 70 to close the shut-off valve 67 in the sewage nozzle supply line whenever the sewage level in the main holding tank 31 drops below a predetermined level.

The sewage mixture which has been comminuted into acceptable particle size, i.e., ¼ in. or less, is discharged from the top of hydroclone 61 to be conveyed through the sewage supply conduit 64 to an injection nozzle 73 for injection into the combustion zone of the furnace chamber 85 of the ship's steam generating unit 84. A pump 88 is included in the supply conduit 64 to provide adequate sewage nozzle injection pressure. A metering device 65 is located downstream flow-wise of the pump 88 to measure the flow-rate of sewage being delivered to the nozzle 73 through the supply conduit 64. A shut-off valve 67 and a flow control valve 66 are located in the conduit 64 intermediate the pump 88 and nozzle 73 to regulate the flow of sewage therethrough.

The present embodiment shows a fuel oil burner 77 of the type which uses steam to atomize the oil and may be of the kind described in U.S. Pat. No. 2,414,459 issued to the assignee of the present invention. The fuel oil is supplied to burner 77 through a conduit 78 which includes a shut-off valve 80, a flow control valve 79 and metering device 63. The atomizing steam is supplied to the oil burner 77 through a conduit 81 which includes a shut-off valve 83 and a flow control valve 82. The sewage injection nozzle 73 is also of the type which uses steam to atomize the sewage and may be of the kind used in the firing of pulp and paper waste and described in U.S. Pat. No. 2,812,212 issued to the assignee of the present invention. The sewage is delivered to the injection nozzle 73 through the conduit 64 which includes a check valve 72 to prevent the backflow of sewage. The atomizing steam is supplied to the sewage nozzle 73 through a conduit 74 which includes a shut-off valve 76 and a flow control valve 75. While the present embodiment is shown with a fuel oil burner and a sewage injection nozzle of the type which use steam to atomize the fuel oil and sewage, it is to be appreciated that the invention may be equipped with fuel oil burners and/or sewage injection nozzles which mechanically atomize the fuel and sewage, e.g., through high pressure, velocity and directional change.

In accordance with the invention, the admission and the flow-rate of sewage injected into the furnace combustion zone is determined by the flow-rate of fuel oil being fired through the burner associated with the injection nozzle, i.e., liquid fuel burner 77. The admission of sewage is regulated by the shutoff valve 67 and the rate of sewage flow is regulated by the control valve 66. Accordingly, the fuel oil flow metering device 63 transmits a control signal through line 69 to open the sewage shut-off valve 67 to admit sewage to the injection nozzle 73 if the fuel oil flow-rate to the burner 77 exceeds a predetermined level which, for the present embodiment has been found to be 10 per cent of the maximum flow-rate capacity of the fuel burner 77. The control associated with the sewage shut-off valve 67 may include a set point represented schematically by arrow Y which provides the means for selecting the fuel rate level at which the shut-off valve will open. It will be understood that the control signal received through line 69 is subservient to that of line 70 thus, if the sewage mixture in the main holding tank 31 is below a predetermined level, the sewage shut-off valve 67 will remain closed. The sewage flow metering device 65 transmits a control signal through line 63 to a controller 68 which also receives a control signal transmitted through branch line 69A from the fuel oil metering device 63. The controller 68, is of a type well known in the art, and may include a set point represented schematically by arrow X which provides the means for selecting the desired ratio of sewage to fuel input. The signal generated by the controller 68 is transmitted through line 89 to the sewage flow control valve 66 to regulate the sewage input to maintain a sewage to fuel input ratio resulting in substantially complete vaporization and incineration of the liquid-solids sewage mixture within the furnace chamber. For the present embodiment, this ratio has been found to be in the range of 0 to 3 pounds of shipboard sewage to 1 pound of fuel oil as fired. The choice and detail of the actual components used to control the valves 66 and 67 are left to the artisan, since there are many known components that can be used.

It should be understood that although the invention has been set forth in conjunction with a liquid fuel burner, it is nevertheless equally applicable with gaseous and solid fuel burners and that the sewage nozzle and fuel burners may be located on one or more of the furnace walls rather than the roof as depicted in the preferred embodiment.

The steam generating unit 84 comprises a setting 90 which is enclosed by casing 91 and insulation 92 and is partitioned into a furnace chamber 85, a superheater gas pass 93 and an uptake gas pass 86. The furnace chamber 85 is defined by front wall 94, a rear wall 95, side walls 96, a roof 97 and a floor 98. The furnace roof and walls are of tangent tube to tube construction with the exception of the rear wall which includes a staggered tube intermediate section forming a screened inlet 99 to the superheater gas pass 93. The roof 97 is formed with an opening 100 which accommodates the passage therethrough of a sewage nozzle guide tube 101 and an opening 102 of substantially greater dimension defining a burner throat. A windbox chamber 103 is disposed on the roof 97 and receives combustion air from a forced draft fan (not shown). The sewage injection nozzle 73 extends through the guide tube and has its discharge end terminating a short distance beyond the furnace side of roof 97. The oil burner 77 extends through a guide tube 104 in a direction normal to the roof 97 and has its discharge end terminating within the periphery of throat opening 102. The injection nozzle 73 is positioned so that its projected longitudinal axis 105 intersects the projected longitudinal axis 106 of fuel burner 77 at a distance of between 3 to 7 feet from the furnace side of the roof 97 as measured along the projected axis 106. It should be understood that the steam generating unit associated with the present invention may use more than one fuel oil burner, in such case there will be one burner operatively associated with the sewage injection in the above described manner.

The furnace chamber 85 is lined by fluid heating tubes 107 which are flow-connected for discharge to an upper drum 108 and for supply from a lower drum 109, the flow connection may be either direct or include headers (not shown) therebetween. The drums 108 and 109 are also flow-connected through a multiplicity of tubes 110 located downstream gas flow-wise of the furnace and forming a steam generating section. A primary superheater 111 and a secondary superheater 112 are housed in the cavity formed between the furnace rear wall 95 and the steam generating section. Sootblowers 114 are directed into the superheater gas pass 93 and the steam generating section pass and are periodically actuated to discharge a high pressure jet of steam or air onto the superheater and generating tubes thereby removing the light coat of ash which may result from the combustion of fuel and sewage. Suitable piping (not shown) is included to supply feedwater to the steam generating unit, to convey saturated steam from the upper drum to the superheaters and to deliver superheated steam to the ship's propulsion system.

During operation of the present invention, the drainage which is collected from the galley, laundry and wash water system 10 is passed through a filter 12 which filters out a portion of the sewage water for use in the shipboard sanitary system 19 while separately discharging the unfiltered portion of sewage and the drainage from the sanitary system 19 into a disinfectant tank 18 for temporary retention therein.

A measured quantity of sewage disinfecting chemical and water are separately introduced into a mix tank 24 and thoroughly mixed therein. The resultant disinfectant liquid mixture is measuredly added to the disinfectant tank 18 and chemically treats the sewage retained therein. The sewage within tank 18 is continuously agitated to insure complete disinfection and prevent clogging.

The treated sewage is thereafter conveyed to a main holding tank 31. The sewage within tank 31 is recirculated and aerated with the air being vented either to atmosphere or to the uptake or outlet gas pass 86 of the steam generating unit 84.

The excess treated sewage from the main holding tank 31 may be temporarily stored in an auxiliary holding tank 41 wherein it is recirculated and aerated with the air being vented to atmosphere. The excess sewage is returned to the main holding tank 31 whenever possible.

The sewage in the main holding tank 31 is discharged to a sump 55 wherein it is ground to a predetermined particle size suitable for use with the injection nozzle 73. The ground sewage is pumped to a centrifugal separator or hydroclone 61 wherein it is screened with oversize particles being returned for further grinding. The acceptably sized sewage is pumped to the nozzle 73 wherein it is steam atomized before injection into the combustion zone of furnace chamber 85. The shut-off valve 67 regulates the admission of sewage to the nozzle 73 and opens only when the sewage in the main holding tank 31 and the fuel flow-rate to burner 77 are above a predetermined level. The control valve 66 regulates the sewage flow-rate to nozzle 73 to maintain a sewage to fuel input ratio resulting in substantially complete vaporization and incineration of the liquid-solids sewage mixture within the furnace chamber 85.

During operation of the steam generating unit, the fuel shut-off valve 80 is open to admit oil to the burner 77, the flow-rate of oil to the burner 77 is regulated by the control valve 79 in accordance with the steam demand of the ship propulsion system. The fuel oil discharging from burner 77 is intimately mixed with combustion air exiting from the windbox 103 and is ignited as it enters the furnace chamber 85 wherein it creates and maintains a combustion zone having a temperature in the range of 2,500°F to 3,500°F. The combustion gases transfer a portion of their heat content to the fluid heating tubes 107 lining the furnace chamber 85 and thence pass through the remainder of the setting 90 giving up heat to the superheater and generating sections. The heat given up by the combustion gases raises the water to saturation temperature as it flows through the tubes 107 and causes it to generate steam as it enters the upper drum 108, additional steam is provided by the generating section. The saturated steam leaving the upper drum 108 is conveyed for series flow through the primary and secondary superheaters, respectively. The superheated steam provided by the generating unit 84 is used as motive force in the ship propulsion system and has many other auxiliary functions as well.

In accordance with the invention, the high temperature combustion zone performs the added function of substantially completely vaporizing and incinerating the liquid-solids sewage mixture. The nozzle 73 is located so as to inject the sewage mixture into the hottest portion of the combustion zone which, for the present embodiment, has been found to be at a distance between 3 to 7 feet from the furnace side of roof 97 as measured along the projected longitudinal axis 106 of burner 77. It should be understood that the location of the combustion zone and its hottest portion will depend on such factors as the dimension of the furnace chamber, and the type, size, location and number of fuel burners associated therewith.

The liquid-solids sewage mixture which is injected into the combustion zone of furnace chamber 85 is substantially completely vaporized and incinerated while in suspension and the resultant vapor and inert ash are discharged out the stack (not shown). The ash and vapor discharge is non-pathogenic and the ash resulting form the incineration of sewage represents only about a five per cent increase in fly ash over the oil ash.

While in accordance with provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

The embodiments of the invention in which an exclusive privilege or property is claimed are defined as follows:

1. A sewage disposal comprising a liquid fuel fired steam generator, wall means including steam generating tubes and defining a furnace and passageway means in gas flow receiving communication with the furnace, burner means for firing liquid fuel within said furnace to maintain a high temperature combustion zone therein for the continuous generation of steam through indirect heat exchange, means for continuously metering the fuel input to the burner means, a flow circuit for conveying a liquid-solids sewage mixture to the furnace, said flow circuit including pump means for pressurizing the sewage mixture passing therethrough and nozzle means for injecting the pressurized sewage mixture directly into the combustion zone, means for introducing steam into said nozzle to atomize the sewage mixture passing therethrough, means responsive to said fuel metering means to allow injection of sewage only when the fuel input exceeds a predetermined level, means for continuously metering the sewage input to the nozzle means and means responsive to said fuel and sewage metering means to regulate the sewage input to maintain a sewage to fuel input ratio resulting in substantially complete vaporization and incineration of the liquid-solids sewage mixture within said furnace.

2. The sewage disposal according to claim 1 wherein the flow circuit includes comminuting means for grinding the sewage mixture before delivery to said nozzle means.

3. The sewage disposal according to claim 2 wherein the flow circuit includes screening means interposed between the comminuting and nozzle means, said screening means allowing only sewage of a predetermined size range to be delivered to the nozzle means while recycling the remainder to said comminuting means for further grinding.

4. The sewage disposal according to claim 1 wherein the flow circuit includes means for temporarily accumulating the sewage.

5. The sewage disposal according to claim 4 including means for circulating air through the accumulated sewage mixture and means for venting the circulated air to said passageway means.

6. A method for sewage disposal including a liquid fuel fired steam generator, wall means including steam generating tubes and defining a furnace and passageway means in gas flow receiving communication with the furnace, and comprising the steps of:

firing liquid fuel within said furnace to maintain a high temperature combustion zone therein for the generation of steam through indirect heat exchange, continuously metering the fuel input to said furnace, injecting a pressurized liquid-solids sewage mixture into said combustion zone only when the fuel input exceeds a predetermined level, steam atomizing the sewage mixture prior to injection into said combustion zone, continuously metering the sewage input to said combustion zone, and regulating the sewage input to maintain a sewage to fuel input ratio resulting in substantially complete vaporization and incineration of the liquid-solids sewage mixture within said furnace.

7. The method according to claim 6 including the step of chemically treating the sewage mixture prior to injection into said combustion zone.

8. The method according to claim 6 including the step of comminuting the sewage mixture prior to injection into said combustion zone.

9. The method according to claim 8 including the steps of screening the comminuted sewage to select only sewage of a predetermined size range for delivery to the nozzle means, and recycling the remaining sewage for further comminution.

10. The method according to claim 6 including the steps of temporarily accumulating the sewage mixture, and circulating air through the accumulated sewage mixture.

11. The method according to claim 10 including the step of venting the circulated air to said passageway means.

12. The method according to claim 6 wherein the step of maintaining a high temperature combustion zone comprises maintaining the temperature within the range of 2,500°F to 3,500°F.

13. The method according to claim 6 wherein the step of injecting a pressurized liquid-solids sewage mixture into said combustion zone comprises injecting the sewage mixture only when the fuel input exceeds 10 per cent of maximum fuel input to said furnace.

14. The method according to claim 6 wherein the step of regulating sewage input comprises maintaining the sewage to fuel input ratio within the range of 0 to 3 lbs. of sewage to 1 lb. of liquid fuel.

* * * * *